(12) United States Patent
Hafermalz et al.

(10) Patent No.: US 11,661,098 B2
(45) Date of Patent: May 30, 2023

(54) FIXED BEARING AND STEERING GEAR

(71) Applicant: Robert Bosch GmbH, Stuttgart (DE)

(72) Inventors: Jens-Uwe Hafermalz, Waeschenbeuren (DE); Ekkehard Kneer, Wendlingen (DE); Dennis Fuechsel, Schwaebisch Gmünd (DE)

(73) Assignee: Robert Bosch GmbH, Stuttgart (DE)

( * ) Notice: Subject to any disclaimer, the term of this patent is extended or adjusted under 35 U.S.C. 154(b) by 1029 days.

(21) Appl. No.: 16/348,752

(22) PCT Filed: Sep. 5, 2017

(86) PCT No.: PCT/EP2017/072171
§ 371 (c)(1),
(2) Date: May 9, 2019

(87) PCT Pub. No.: WO2018/086782
PCT Pub. Date: May 17, 2018

(65) Prior Publication Data
US 2019/0270476 A1    Sep. 5, 2019

(30) Foreign Application Priority Data
Nov. 9, 2016 (DE) .................. 10 2016 121 412.4

(51) Int. Cl.
*B62D 3/04* (2006.01)
*B62D 5/04* (2006.01)
(Continued)

(52) U.S. Cl.
CPC .............. *B62D 3/04* (2013.01); *B62D 5/04* (2013.01); *B62D 5/0409* (2013.01);
(Continued)

(58) Field of Classification Search
CPC .......... B62D 3/04; B62D 5/04; B62D 5/0409; F16C 19/185; F16C 33/60; F16C 33/605
See application file for complete search history.

(56) References Cited

U.S. PATENT DOCUMENTS

| | | | | |
|---|---|---|---|---|
| 331,899 A | * | 12/1885 | Marlin | F16C 33/60 |
| | | | | 384/456 |
| 715,171 A | * | 12/1902 | Stilson | F16C 33/36 |
| | | | | 384/550 |

(Continued)

FOREIGN PATENT DOCUMENTS

| | | |
|---|---|---|
| DE | 198 07 514 A | 8/1999 |
| DE | 103 36 856 A1 | 3/2005 |

(Continued)

OTHER PUBLICATIONS

English Translation of WO-2014177338-A1.*
(Continued)

*Primary Examiner* — Kevin Hurley
*Assistant Examiner* — Harold Eric Pahlck, III
(74) *Attorney, Agent, or Firm* — Maginot, Moore & Beck LLP

(57) ABSTRACT

A fixed bearing for a steering gear includes a bearing sleeve, and ball bearing having an inner bearing shell and outer bearing shell. The inner shell is configured to hold a pinion shaft of the steering gear. The outer shell is held in the sleeve. Each shell respectively has at least one guide groove to hold and guide bearing balls, and a pivot ring with an outer ring and inner ring pivotably connected via at least one torsion web. The inner ring is connected to the sleeve. The outer ring is configured to mount the fixed bearing in a steering gear housing. At least one shell is formed from partial shells, each partial shell defining at least a portion of the respective guide groove. The multi-part design enables relatively large guide groove shoulders and a correspond- (Continued)

ingly relatively high ball bearing load-bearing capacity even under a relatively high tilting load during steering gear operation.

15 Claims, 2 Drawing Sheets

(51) Int. Cl.
*F16C 19/18* (2006.01)
*F16C 33/60* (2006.01)

(52) U.S. Cl.
CPC ............ *F16C 19/185* (2013.01); *F16C 33/60* (2013.01); *F16C 33/605* (2013.01); *F16C 2326/24* (2013.01)

(56) References Cited

U.S. PATENT DOCUMENTS

| | | | | |
|---|---|---|---|---|
| 845,632 A * | 2/1907 | Gurney | F16C 19/06 | 384/492 |
| 956,588 A * | 5/1910 | Lockwood | F16C 25/06 | 384/571 |
| 980,427 A * | 1/1911 | Lockwood | F16C 33/605 | 384/561 |
| 1,018,121 A * | 2/1912 | Lockwood | F16C 19/385 | 384/571 |
| 1,058,767 A * | 4/1913 | Lockwood | F16C 25/06 | 384/571 |
| 1,058,768 A * | 4/1913 | Lockwood | F16C 33/60 | 384/550 |
| 1,233,476 A * | 7/1917 | Hughes | F16C 43/04 | 384/501 |
| 1,261,154 A * | 4/1918 | Newmann | F16C 33/3706 | 384/520 |
| 1,324,756 A * | 12/1919 | Schatz | F16C 33/60 | 384/505 |
| 1,356,326 A * | 10/1920 | Wingquist | F16C 19/364 | 384/571 |
| 1,418,886 A * | 6/1922 | Searles | F16C 19/184 | 384/504 |
| 1,426,236 A * | 8/1922 | Williams | F16C 33/61 | 384/505 |
| 1,430,319 A * | 9/1922 | Parker | F16C 19/166 | 384/498 |
| 1,742,840 A * | 1/1930 | Wing | F16C 33/60 | 29/898.063 |
| 2,620,241 A * | 12/1952 | Potter | F16C 33/60 | 384/473 |
| 2,704,230 A * | 3/1955 | Roschlau | F16C 33/00 | 384/520 |
| 2,712,969 A * | 7/1955 | Spicacci | F16C 33/60 | 384/477 |
| 3,583,511 A * | 6/1971 | Asberg | F16C 19/187 | 180/370 |
| 3,586,396 A * | 6/1971 | Barr | B23D 31/003 | 384/49 |
| 3,589,747 A * | 6/1971 | Asberg | B60B 27/0005 | 280/105 |
| 3,762,783 A * | 10/1973 | Hay | F16C 19/54 | 384/558 |
| 3,940,191 A * | 2/1976 | Tomioka | B21B 31/076 | 384/468 |
| 3,940,192 A * | 2/1976 | Hagele | B62D 3/04 | 384/519 |
| 3,978,566 A * | 9/1976 | Ladin | B23P 15/003 | 523/176 |
| 4,189,816 A * | 2/1980 | Chalansonnet | B21H 1/12 | 29/898.066 |
| 4,718,781 A * | 1/1988 | Gerard | F16C 19/166 | 384/537 |
| 4,865,472 A * | 9/1989 | Jacob | F16C 19/187 | 384/503 |
| 4,943,171 A * | 7/1990 | Hofmann | F16C 19/187 | 301/124.1 |
| 4,948,277 A * | 8/1990 | Alff | G01P 3/443 | 384/477 |
| 4,986,607 A * | 1/1991 | Hofmann | F16C 19/187 | 384/537 |
| 5,001,831 A * | 3/1991 | Vinciguerra | F16C 33/605 | 29/898.067 |
| 5,009,523 A * | 4/1991 | Folger | F16C 35/061 | 384/571 |
| 5,320,433 A * | 6/1994 | Kimata | F16C 33/6611 | 384/473 |
| 5,454,438 A * | 10/1995 | Chikuma | B62D 5/0409 | 180/443 |
| 5,550,467 A * | 8/1996 | Goossens | F16C 33/723 | 324/207.22 |
| 5,603,575 A * | 2/1997 | Ouchi | F16C 33/78 | 384/446 |
| 5,764,049 A * | 6/1998 | Hofmann | B60B 27/0084 | 324/207.25 |
| 2001/0046339 A1* | 11/2001 | Miyazaki | F16C 33/62 | 384/544 |
| 2003/0093188 A1* | 5/2003 | Morita | B60C 23/0408 | 701/1 |
| 2005/0232528 A1* | 10/2005 | Gobel | F16C 33/4605 | 384/571 |
| 2006/0145686 A1* | 7/2006 | Sakamoto | F16C 33/7879 | 324/174 |
| 2008/0044118 A1* | 2/2008 | Haepp | G01P 3/443 | 384/448 |
| 2009/0010586 A1* | 1/2009 | Mock | F16C 19/181 | 384/513 |
| 2009/0028482 A1* | 1/2009 | Iwata | F16C 9/00 | 384/429 |
| 2009/0263065 A1* | 10/2009 | Kobayashi | F16C 33/64 | 384/515 |
| 2010/0003096 A1* | 1/2010 | Peigne | F16C 19/10 | 408/199 |
| 2010/0058591 A1* | 3/2010 | Kobayashi | F16C 33/64 | 29/898 |
| 2010/0061672 A1* | 3/2010 | Dizlek | F16C 19/49 | 384/505 |
| 2010/0104234 A1* | 4/2010 | Nuissl | F16C 19/38 | 384/572 |
| 2010/0215307 A1* | 8/2010 | Loeschner | F16C 19/49 | 384/571 |
| 2010/0284643 A1* | 11/2010 | Nuissl | F16C 19/184 | 384/577 |
| 2010/0296759 A1* | 11/2010 | Dlugai | G01P 3/487 | 384/448 |
| 2010/0303395 A1* | 12/2010 | Langer | F16D 1/076 | 29/898.04 |
| 2012/0211470 A1* | 8/2012 | Webster | F16C 33/48 | 219/68 |
| 2013/0129504 A1* | 5/2013 | Heldner | F01D 25/16 | 384/91 |
| 2013/0209019 A1* | 8/2013 | Miyamoto | B23D 31/003 | 225/2 |
| 2013/0266248 A1* | 10/2013 | Wolf | F16C 41/04 | 384/452 |
| 2014/0029886 A1* | 1/2014 | Hofmann | F16C 33/60 | 29/898.066 |
| 2014/0153855 A1* | 6/2014 | Adane | F16C 33/60 | 384/473 |
| 2014/0169717 A1* | 6/2014 | Schroder | F16C 33/585 | 384/558 |
| 2014/0208593 A1* | 7/2014 | Kaiser | F16C 43/086 | 29/898.062 |
| 2015/0192174 A1* | 7/2015 | Shimizu | F03D 13/35 | 384/473 |
| 2016/0369841 A1* | 12/2016 | Ciulla | F16C 19/18 | |
| 2017/0097046 A1* | 4/2017 | Hadden | F16C 23/084 | |
| 2017/0343087 A1* | 11/2017 | Asakura | F16H 25/2223 | |
| 2017/0350481 A1* | 12/2017 | Nakayama | F16H 25/2233 | |

(56) References Cited

U.S. PATENT DOCUMENTS

| | | | | |
|---|---|---|---|---|
| 2018/0163776 A1* | 6/2018 | Heilmann | ............. | F16C 19/184 |
| 2018/0180094 A1* | 6/2018 | Ehrhard | .................. | F16C 33/58 |
| 2018/0229760 A1* | 8/2018 | Rey | ...................... | B62D 5/0403 |

FOREIGN PATENT DOCUMENTS

| | | |
|---|---|---|
| DE | 10 2006 060 679 A1 | 6/2008 |
| DE | 10 2008 040 673 A1 | 1/2010 |
| DE | 10 2009 054 655 A1 | 6/2011 |
| DE | 10 2010 002 958 A1 | 9/2011 |
| DE | 10 2013 104 521 A1 | 11/2014 |
| DE | 10 2014 107 116 A1 | 11/2014 |
| EP | 2 250 405 B1 | 11/2010 |
| EP | 2 513 503 B1 | 10/2012 |
| EP | 2 594 457 A2 | 5/2013 |
| EP | 2 694 355 B1 | 2/2014 |
| EP | 2 836 416 B1 | 2/2015 |
| EP | 2 836 417 B1 | 2/2015 |
| EP | 2 991 887 B1 | 3/2016 |
| WO | 0140046 A1 | 6/2001 |
| WO | 2011/015374 A1 | 2/2011 |
| WO | WO-2014177338 A1 * | 11/2014 ........... B62D 5/0409 |

OTHER PUBLICATIONS

International Search Report corresponding to PCT Application No. PCT/EP2017/072171, dated Nov. 30, 2017 (German and English language document) (7 pages).

* cited by examiner

FIXED BEARING AND STEERING GEAR

This application is a 35 U.S.C. § 371 National Stage Application of PCT/EP2017/072171, filed on Sep. 5, 2017, which claims the benefit of priority to Serial No. DE 10 2016 121 412.4, filed on Nov. 9, 2016 in Germany, the disclosures of which are incorporated herein by reference in their entirety.

The disclosure relates to a fixed bearing for a steering gear. The disclosure furthermore relates to a steering gear for a steering system, in particular a power steering system, of a motor vehicle having a fixed bearing of said type.

BACKGROUND

In most motor vehicles, there are installed power steering systems which, during steering maneuvers, generate an assisting torque and thereby reduce the steering moment that has to be imparted to the steering column by the driver.

The known power steering systems are based on a steering gear which converts the drive power of a hydraulic or electric steering motor and transmits this to, for example, the steering column. Such steering gears are generally designed in the form of a helical rolling-contact gear and in particular as a helical-wheel gear or worm gear. These comprise a toothed wheel, which is connected directly or indirectly to the steering column, and a pinion which meshes with said toothed wheel and which is driven by the drive via a shaft.

What has been found to be a problem in the case of such steering gears is gear play which arises owing to component tolerances, different thermal expansions of the gear elements, owing to wear and/or owing to settling of the material in the case of toothed wheels composed of plastic. In particular during so-called alternating steering, that is to say during directly successive steering maneuvers with an alternating steer angle direction, such gear play generates undesired noises, which result from the alternating abutment of opposite flanks of the teeth of pinion and toothed wheel.

It is known for this gear play to be eliminated by virtue of the pinion shaft being mounted so as to be pivotable about an axis running perpendicular to the longitudinal axis of the pinion shaft and at a distance from the toothing engagement of pinion and toothed wheel, and being pressed against the toothed wheel by means of one or more spring elements. The pivotability of the pinion shaft is in this case generally integrated into one of the two bearing arrangements by means of which the pinion shaft is mounted at the ends. This bearing arrangement is referred to as "fixed bearing". The bearing arrangement in the region of the other end is then designed with a defined play (so-called "floating bearing") in order to permit the deflection caused by the pivoting movement. The fixed bearing is generally provided at the drive side, whereas the floating bearing is provided at the free end of the pinion shaft. The one or more spring elements for pressing the pinion against the toothed wheel may in this case be integrated both into the floating bearing and into the fixed bearing.

A steering gear of said type, in which the spring force for the spring loading is generated by means of the fixed bearing, is known for example from DE 10 2009 054 655 A1. In the case of this steering gear, provision is made for the rolling bearing, which receives the pinion shaft in the region of the fixed bearing, to be mounted at the outside in a pivot sleeve. The pivot sleeve comprises a bearing sleeve, which receives the rolling bearing substantially without play, and an outer ring, which is held substantially without play in a receptacle of a housing of the steering gear, wherein the outer ring and the bearing sleeve are connected by means of multiple torsion webs which are twisted in the event of the outer ring rotating relative to the bearing sleeve. After the assembly of the steering gear, the torsion webs are twisted such that the elastic restoring action thereby generated effects the spring loading of the pinion shaft.

Embodiments of steering gears similar to that of DE 10 2009 054 655 A1 are known from DE 10 2008 040 673 A1, EP 2 836 416 B1 and EP 2 836 417 B1.

In the case of the steering gears known from the cited documents, use is made of single-row deep-groove ball bearings of conventional type of construction. These comprise in each case one single-piece inner bearing shell and one single-piece outer bearing shell. The bearing shells form in each case one guide groove for receiving and guiding balls. The assembly of such a deep-groove ball bearing requires an annular gap formed between the bearing shells with a defined minimum width, which is dimensioned such that, in the case of a maximum possible eccentric arrangement of the inner bearing shell within the outer bearing shell during the course of the assembly process, the balls can be inserted into the then sickle-shaped gap. This minimum width of the annular gap limits the extent to which the shoulders of the guide grooves overlap the balls in a radial direction with respect to the longitudinal axis or with respect to the axis of rotation of the ball bearing. Owing to the relatively high tilting load of the ball bearing in a steering gear such as is known from the cited documents, the balls run on the edge of the raceway shoulders. The load-bearing capacity of a ball bearing loaded in this way is therefore significantly dependent on the extent of the overlap of the shoulders of the guide grooves with respect to the balls. In the case of a relatively small ball bearing, it would specifically be the case that no full pressure ellipse of the balls on the raceway of the guide grooves would be generated. One solution to this problem could lie in dimensioning the ball bearing to be as large as possible, thus realizing the largest possible support surface of the balls on the raceway. Such relatively large ball bearings however require a correspondingly large structural space in the steering gear, which is commonly not available or has an adverse effect overall owing to a correspondingly enlarged embodiment of the steering gear.

EP 2 250 405 B1 has also disclosed a steering gear for a steering system of a motor vehicle, in the case of which a pinion shaft is, at one end, mounted pivotably within a housing, wherein either the pinion shaft or a bearing ring arranged on the pinion shaft forms an encircling guide groove on which a multiplicity of balls can roll in an encircling ball row. The longitudinal extent or the radius of the guide grooves is greater than the longitudinal extent of those portions of the balls which are received by said guide grooves, or than the radius of the balls. At the outer side, the balls are mounted in two bearing rings, which are each supported, on the distal side in relation to the other bearing ring, on the housing, wherein this support is, in the case of one of the bearing rings, provided directly and, in the case of the other bearing ring, provided with the interposition of a spring element which generates an axial preload force. By means of this bearing arrangement, the pinion shaft is preloaded in an axial direction. This preloading leads, in combination with a longitudinal axial displacement of the balls within the guide grooves, to a resetting force which counteracts an occurring displacement of the pinion shaft irrespective of the direction of said displacement. Two-row embodiments of corresponding bearing arrangements of the pinion shaft are likewise disclosed in EP 2 250 405 B1.

The disclosure is based on the object of specifying a fixed bearing for a steering gear, such as is basically known from DE 10 2009 054 655 A1, DE 10 2008 040 673 A1, EP 2 836 416 B1 and EP 2 836 417 B1, which can be dimensioned to be relatively small with relatively high load-bearing capacity.

SUMMARY

Said object is achieved by means of a fixed bearing, a steering gear for a steering system of a motor vehicle, and a steering system having a steering gear of said type as per the disclosure. Advantageous embodiments of the fixed bearing according to the disclosure and thus of the steering gear according to the disclosure and of the steering system according to the disclosure are the subject of the claims and/or emerge from the following description and drawings.

A fixed bearing according to the disclosure for a steering gear comprises a ball bearing which has an inner bearing shell, which is provided for receiving a pinion shaft of the steering gear, and an outer bearing shell, which is received in a bearing sleeve, wherein the inner bearing shell and the outer bearing shell each have at least one guide groove for receiving and guiding balls of the ball bearing. The guide groove(s) is/are of doubly curved form in a known manner, specifically both in a circumferential direction and (at least in portions) in cross section. Here, provision may preferably be made for the radius of the curvature in the cross section to correspond substantially to the radius of the balls. A fixed bearing according to the disclosure furthermore comprises a pivot ring which has an outer ring and an inner ring which are pivotably connected by means of one or more torsion webs, wherein the inner ring is connected to the bearing sleeve (which is intended to encompass an integral and in particular single-piece configuration), and the outer ring is provided for the mounting of the fixed bearing in a housing of the steering gear. According to the disclosure, a fixed bearing of said type is characterized in that the inner bearing shell and/or the outer bearing shell comprises at least, and preferably exactly, two shell parts, each of which forms a separate guide groove or a portion of a guide groove. If the shell parts each form a separate guide groove, these serve for guiding in each case one encircling row of the balls, whereas, in the case of the shell parts forming only a portion of a guide groove, said portions together serve for guiding an encircling row of the balls.

By means of the multi-part nature according to the disclosure of the inner and/or of the outer bearing shell of the ball bearing, it is made possible for the shoulders of the guide grooves to be of relatively large form, whereby a correspondingly high load-bearing capacity of the ball bearing is achieved even in the presence of a relatively high tilting load, such as may arise during the operation of a steering gear which comprises the ball bearing.

A steering gear according to the disclosure which is provided for a steering system of a motor vehicle comprises at least one toothed wheel, a helical pinion (in particular worm pinion) which meshes with said toothed wheel, and a helical pinion shaft which comprises the helical pinion, wherein the helical pinion shaft is mounted on one side of the helical pinion in a fixed bearing according to the disclosure, and wherein the outer ring of the pivot ring of the fixed bearing is mounted directly or indirectly, and preferably immovably, in a housing of the steering gear.

A steering system according to the disclosure comprises at least one steering gear according to the disclosure and a steering motor which is connected with rotational driving action to the helical pinion shaft. The toothed wheel of the steering gear may furthermore be connected rotationally conjointly or with rotational driving action to a steering shaft, in particular a steering column, of the steering system. The steering system according to the disclosure may in particular be in the form of a power steering system by means of which an assisting torque can be generated by means of the steering motor, such that a steering moment that has to be imparted to the steering column, for the purposes of steering the motor vehicle, by a driver of a motor vehicle which comprises the power steering system is reduced. Alternatively, it is also possible for the steering system to be designed such that the entire steering moment required for the purposes of steering is generated by the steering motor.

The disclosure also relates to a motor vehicle having a steering system according to the disclosure.

In a preferred embodiment of a fixed bearing according to the disclosure, provision may be made for the inner bearing shell to comprise at least, and preferably exactly, two shell parts, and for the outer bearing shell to be formed as a single piece. In this way, particularly advantageous producibility for the ball bearing and thus the fixed bearing according to the disclosure can be realized. The fact that a and in particular the outer bearing shell is "formed as a single piece" is to be understood according to the disclosure to mean that the associated (complete) guide groove is formed in a single-piece component. This is not intended to rule out yet further components, which may be assigned to the corresponding bearing shell, being connected to said component.

In a further preferred embodiment of a fixed bearing according to the disclosure, provision may furthermore be made for the ball bearing to be of single-row form. Alternatively, it is possible for the ball bearing to be of multi-row, and in particular two-row, form. A multi-part and in particular two-row ball bearing may be distinguished by a particularly high load-bearing capacity. At the same time, this may however exhibit the disadvantage of a relatively large structural space required for the integration thereof into a fixed bearing according to the disclosure, in particular along the longitudinal axis or axis of rotation of the ball bearing (or of the pinion shaft). By contrast, a single-row ball bearing can be dimensioned to be extremely compact, wherein, nevertheless, owing to the embodiment according to the disclosure and the resulting possible relatively large overlap formed by the guide grooves with respect to the balls, a sufficient load-bearing capacity can be provided even in the presence of a relatively high tilting load of the ball bearing.

In the case of a single-row embodiment of the ball bearing of a fixed bearing according to the disclosure, in the case of which the shell parts of the inner and/or outer bearing shell consequently each form only a portion of a guide groove, provision may furthermore preferably be made for the shell parts (of at least one, possibly both bearing shell(s)) to be supported against one another. This support may be realized indirectly or, particularly preferably, directly. In the case of the latter embodiment, it can advantageously be achieved that the guide groove formed by the two portions has substantially no gap, which can have a positive effect on the use of the ball bearing and thus of the fixed bearing according to the disclosure.

In the case of a two-row embodiment of the ball bearing of a fixed bearing according to the disclosure in which the shell parts of the inner and/or outer bearing shell each form a separate guide groove, provision may preferably be made for the shell parts (of at least one, possibly both bearing shell(s)) to delimit a gap, and to accordingly not be supported directly or indirectly against one another. In this way, a relative displaceability of said shell parts along the longitudinal axis or axis of rotation of the ball bearing can be realized, which can be advantageously utilized for setting a substantially play-free state of the arrangement of the balls within the bearing shells.

In a further preferred embodiment of a fixed bearing according to the disclosure, provision may be made for the shell parts to be held together by means of a separate fastening element (that is to say by means of a fastening element provided exclusively for this purpose). In this way, it is possible in particular for assembly of a fixed bearing according to the disclosure to be facilitated, because separate assembly of the ball bearing can firstly be performed, and said ball bearing can then be handled as a coherent unit during the further assembly of the fixed bearing.

The indefinite articles ("a", "an", "of a" and "of an"), in particular in the patent claims and in the description that generally discusses the patent claims, are to be understood as such and not as numerals. Components discussed in concrete terms using these are thus to be understood as being present at least singly, and as being capable of being present in a multiplicity.

BRIEF DESCRIPTION OF THE DRAWINGS

The disclosure will be discussed in more detail below on the basis of an exemplary embodiment illustrated in the drawings. In the drawings.

DETAILED DESCRIPTION

Figure 1:
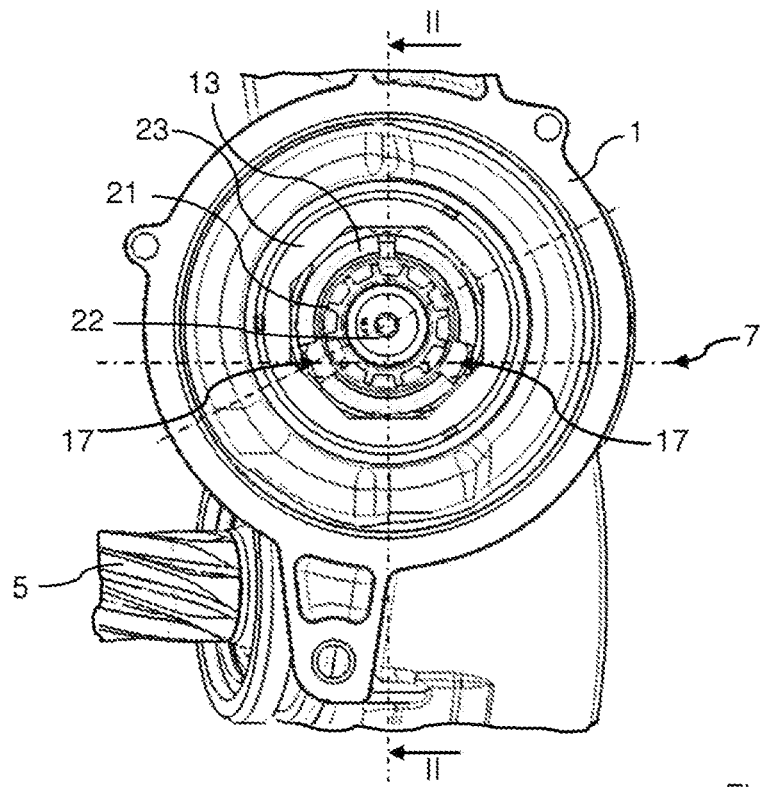
FIG. 1 shows a steering gear according to the disclosure in a side view.
Figure 2:
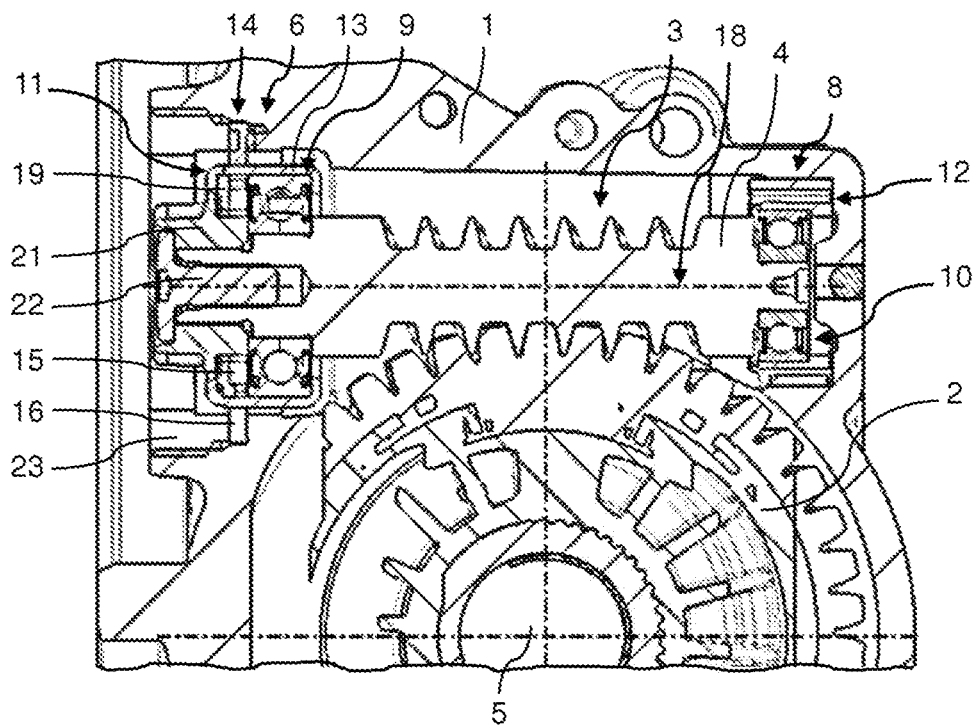
FIG. 2 shows a longitudinal section through the steering gear along the section plane II-II in FIG. 1.

FIGS. 1 and 2 show the main constituent parts of a steering gear according to the disclosure for a steering system of a motor vehicle. Said steering gear comprises a housing 1, within which there are mounted a toothed wheel 2 and a helical pinion 3 which meshes with the toothed wheel 2. The helical pinion 3 and a helical pinion shaft 4 which comprises the helical pinion 3 are formed integrally in the form of a worm.

The toothed wheel 2 is fastened fixedly to an output shaft 5 (cf. FIG. 1) of the steering gear. Said output shaft 5, which in the exemplary embodiment shown has a toothing for a secure rotationally conjoint connection to the toothed wheel 2, may for example mesh with a steering rod which is formed at least in one portion as a toothed rack, whereby said steering rod performs a translational movement which can, in a known manner, be converted by means of wheel steering levers (not illustrated) into a pivoting movement of steered wheels (not illustrated) of the motor vehicle. The output shaft 5 may however also be a steering column of the power steering system, which steering column is connected to a steering wheel and acts via a steering pinion on the steering rod.

The helical pinion shaft 4 has a drive-side end, by means of which said helical pinion shaft is connectable to the output shaft of a steering motor (for example an electric motor) which is not illustrated. In the region of said drive-side end, the helical pinion shaft 4 is mounted by means of a first bearing arrangement in the housing 1. This bearing arrangement is formed as a fixed bearing 6 according to the disclosure, which permits pivoting of the helical pinion shaft 4 about a pivot axis 7 (cf. FIGS. 1 and 3). This pivoting gives rise to a deflection of the free end, situated opposite the drive-side end, of the helical pinion shaft 4, which is mounted there by means of a floating bearing 8 in a corresponding receptacle of the housing 1. Said floating bearing 8 is designed to permit the deflection of said free end that results from the pivoting of the helical pinion shaft 4.

Both the fixed bearing 6 and the floating bearing 8 comprise in each case one rotary bearing in the form of a ball bearing 9, 10. The corresponding portions of the helical pinion shaft 4 are mounted in inner bearing shells of said ball bearings 9, 10, whereas outer bearing shells of the ball bearings 9, 10 are mounted in each case one bearing device 11, 12, which bearing devices are in turn received in corresponding receptacles of the housing 1. The bearing devices 11, 12 are structurally designed so as to permit, in the case of the fixed bearing 6, the pivoting of the helical pinion shaft 4 about the pivot axis 7 and, in the case of the floating bearing 8, the deflection of the free end of the helical pinion shaft 4.

For this purpose, the bearing device 11 of the fixed bearing 6 comprises a bearing sleeve 13 with circular cross section, which, at an inner side, in a first longitudinal portion, receives the ball bearing 9 and, in a second longitudinal portion, receives an inner ring 15 of a pivot ring 14. The inner ring 15 of the pivot ring 14 is, with the interposition of a support disk 19, mounted rotationally conjointly and in an axially secured manner within the bearing sleeve 13, wherein the inner ring 15 is supported, with the interposition of an intermediate disk 20, on the outer bearing shell 26 of the rolling bearing 9. The pivot ring 14 comprises not only the inner ring 15 but also an outer ring 16. The outer ring 16 is connected via two torsion webs 17 (cf. FIGS. 1 and 3) to the inner ring 15. The outer ring 16, the inner ring 15 and the torsion webs 17 are for example formed as a single piece, for example from spring steel.

The ball bearing 9 is axially secured in position on the helical pinion shaft 4, with the interposition of a thrust piece 21, by means of a screw 22 which is screwed into an internal thread integrated into the corresponding end of the helical pinion shaft 4. The outer ring 16 of the pivot ring 14 is axially secured in position within the housing 1 by means of a screw ring 23 which has an external thread which is screwed into a corresponding internal thread of the housing 1.

The two torsion webs 17 form the pivot axis 7 about which the outer ring 16 is pivotable relative to the inner ring 15. The torsion webs 17 and thus the pivot axis 7 however in this case run not through the center of the pivot ring 14 and thus of the cross section of the helical pinion shaft 4 but rather so as to be radially offset in relation thereto (cf. FIG. 3). The pivot axis 7 thus does not intersect the longitudinal axis 18 of the helical pinion shaft 4. Owing to the radial offset of the torsion webs 17 relative to the center of the pivot ring 14, the pivot axis 7 is relocated into the vicinity of the outer circumference of the helical pinion shaft 4, whereby the generation of reaction moments that arise or would arise owing to the toothing forces that are generated during the toothing engagement of helical pinion 3 and toothed wheel 2, in conjunction with the spacing of the line of action of said toothing forces from the pivot axis 7, can be reduced or eliminated. For the most complete possible elimination of the reaction moments, provision is made for the pivot axis 7 to lie within that tangential plane which is formed at the contact point of the two pitch circles or rolling circles of toothed wheel 2 and helical pinion 3.

The torsion webs 17 of the pivot ring 14 not only permit a pivoting of the outer ring 16 relative to the inner ring 15 and thus of the helical pinion shaft 4 relative to the toothed wheel 2 or to the housing 1 but simultaneously also impart the spring force by means of which the helical pinion 3 of the helical pinion shaft 4 is forced into the toothing of the toothed wheel 2 in order to realize the least possible gear play and thus correspondingly little generation of noise during the operation of the steering gear, in particular during so-called alternating steering. Said spring force arises from the fact that, during the assembly of the steering gear, the helical pinion shaft 4 is deflected, owing to contact with the toothed wheel 2, to such an extent as to generate sufficient torsion of the torsion webs 17, whereby the elastic restoring moments resulting from the torsion of the torsion webs 17 act counter to said deflection of the helical pinion shaft 4 and thus force the latter against the toothed wheel 2.

The integration of the fixed bearing into the steering gear accordingly provides a relatively small spring-loaded obliquity (for example of 0.7°) of the ball bearing 9 or of the longitudinal axis 18 thereof relative to the outer ring 16 of the pivot ring 14 or to the longitudinal axis thereof. This can result in a considerable tilting load of the ball bearing 9, which basically has an adverse effect on the load-bearing capacity and thus the service life of a ball bearing 9 of said type. In order to compensate this adverse effect of the tilting load on the load-bearing capacity of the ball bearing 9, provision is made for the height of the shoulders of the guide grooves 28 formed by the outer bearing shell 26 and the inner bearing shell 27, and thus the overlap of the guide grooves 28 with respect to the balls 29 of the ball bearing 9, to be configured to be relatively large. This relatively large overlap leads to a relatively narrow annular gap which is formed between the outer bearing shell 26 and the inner bearing shell 27 of the ball bearing 9. This relatively narrow gap would impede assembly of the ball bearing 9 in the case of an embodiment of conventional type of construction with both a single-piece outer bearing shell and a single-piece inner bearing shell. According to the disclosure, such assembly is however made possible by virtue of the fact that, in the present exemplary embodiment, the inner bearing shell 27 is formed from two shell parts 30. Thus, during assembly of the ball bearing 9, it is possible firstly for the outer bearing shell 26 and a first of the shell parts 30 of the inner bearing shell 27 to be positioned relative to one another such that said shell part 30 is arranged preferably as far as possible coaxially within the outer bearing shell 26. It is thereupon possible for the balls 29, preferably directly in combination with a ball cage 31, to be arranged in the guide groove 28 formed by the outer bearing shell 26 and in that portion of the guide groove 28 of the inner bearing shell 27 which is formed by the first shell part 30. Subsequently, the second shell part 30 can be installed. In the assembled state, provision is made for the two shell parts 30 to be supported directly against one another, and thus for a substantially gap-free transition of the two portions that together form the guide groove 28 of the inner bearing shell 27 to be achieved.

The two shell parts 30 may then be securely held together by means of at least one fastening element (not illustrated), for example in the form of a plastics sleeve, in the form of plastics clips and/or in the form of a slotted sheet-metal sleeve, in order that, during assembly of the fixed bearing 6, the ball bearing 9 can be handled as a coherent unit. After an integration of the fixed bearing 6 into the steering gear, the one or more fastening elements can then be removed again, because the ball bearing 9 is then securely held together as a result of the described integration into the steering gear. Embodiments are however also possible in which the one or more fastening elements remain installed even after an integration of the fixed bearing 6 into the steering gear.

Figure 4:
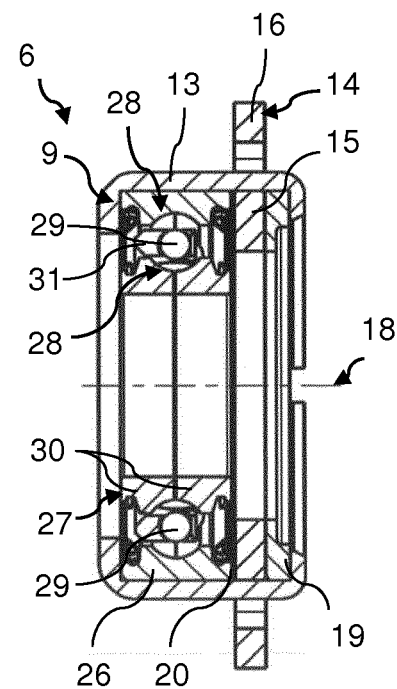
FIG. 4 shows a longitudinal section through the fixed bearing as per FIG. 3.
Figure 5:
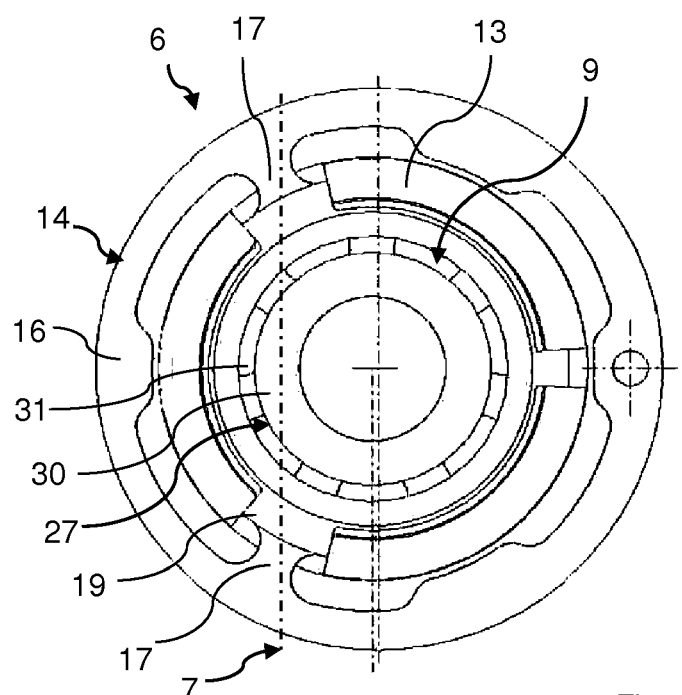
FIG. 5 shows an alternative embodiment of a fixed bearing for a steering gear as per FIGS. 1 and 2 in a view from the front.
Figure 6:
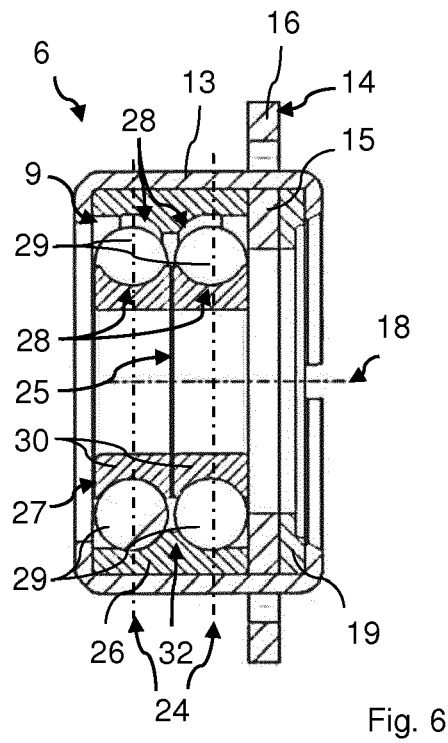
FIG. 6 shows a longitudinal section through the fixed bearing as per FIG. 5.

FIGS. 5 and 6 show an alternative embodiment of a fixed bearing 6 which may be provided for integration into a steering gear as per FIGS. 1 and 2. A major distinguishing feature in relation to the fixed bearing 6 as per FIGS. 1 to 4 is the use of a two-row ball bearing 9 instead of a single-row ball bearing 9. For this purpose, the ball bearing 9 of the fixed bearing 6 as per FIGS. 5 and 6 has, in turn, a single-piece outer bearing shell 26, in which, at the inner side, there are formed two guide grooves 28 for in each case one row of balls 29. Said guide grooves 28 are in this case formed so as to run in curved fashion, in each case with a radius substantially corresponding to the radius of the balls 29, from a centrally (in relation to the longitudinal extent of the ball bearing 9) arranged web 32 in the direction of in each case one longitudinal axial end of the outer bearing shell 26, until said guide grooves transition into in each case one portion running parallel or coaxially with respect to the longitudinal axis 18 of the ball bearing 9. The ball bearing 9 of the fixed bearing 6 as per FIGS. 5 and 6 is accordingly designed in the manner of a two-row angular-contact ball bearing with an O-type arrangement.

By contrast, the inner bearing shell 27 of the ball bearing 9 is composed, in turn, of two shell parts 30, each of which forms in each case one (complete) guide groove 28 for the balls 29 (in each case with a cross-sectional radius which substantially corresponds to the radius of the balls 29). Said guide grooves 28 are formed differently than the guide grooves 28 of the outer bearing shell 26 but mirror-symmetrically with respect to in each case one radial axis 24 arranged centrally in relation to the longitudinal extent of the shell parts 30.

By contrast to the ball bearing 9 of the fixed bearing 6 as per FIGS. 1 to 4, it is provided in the case of the ball bearing 9 of the fixed bearing 6 as per FIGS. 5 and 6 that, in the assembled state (even taking into consideration possible shape and position tolerances), an encircling gap 25 is formed between the shell parts 30 of the inner bearing shell 27 of the ball bearing 9, whereby it can be ensured that, by means of the screw 22 and the thrust piece 21 (cf. FIG. 2), substantial freedom from play of the balls 29 within the bearing shells 26, 27 with, at the same time, the least possible friction resistance can be set. An embodiment of a fixed bearing 6 according to the disclosure as per FIGS. 5 and 6 without a gap 25 between the shell parts 30 is likewise possible.

Otherwise, the fixed bearing 6 in the embodiment as per FIGS. 5 and 6 corresponds to the fixed bearing 6 as per FIGS. 1 to 4. One exception is however that no intermediate disk 20 is provided for this. It is however self-evidently also possible for a corresponding intermediate disk 20 to be integrated into this fixed bearing 6 also.

Figure 3:
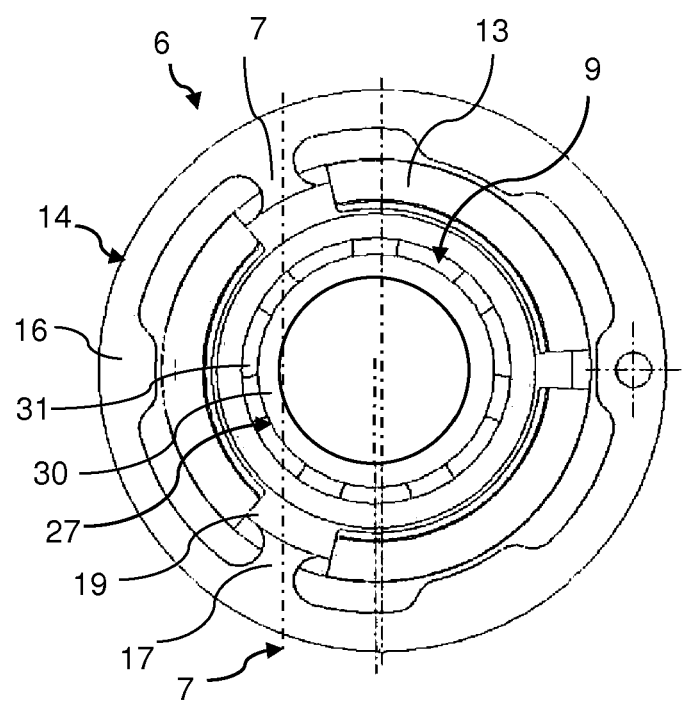
FIG. 3 shows the fixed bearing of the steering gear as per FIGS. 1 and 2 in a view from the front.

It is basically also possible for the ball bearing 9 in the case of a fixed bearing 6 as per FIGS. 3 and 4 to be formed with a gap 25 as is provided in the case of the ball bearing 9 of the fixed bearing 6 as per FIGS. 5 and 6.

LIST OF REFERENCE DESIGNATIONS

1 Housing
2 Toothed wheel
3 Helical pinion
4 Helical pinion shaft
5 Output shaft
6 Fixed bearing
7 Pivot axis
8 Floating bearing
9 Ball bearing of the fixed bearing
10 Ball bearing of the floating bearing
11 Bearing device of the fixed bearing
12 Bearing device of the floating bearing
13 Bearing sleeve
14 Pivot ring
15 Inner ring of the pivot ring
16 Outer ring of the pivot ring
17 Torsion web
18 Longitudinal axis of the helical pinion shaft/of the ball bearing
19 Support disk
20 Intermediate disk
21 Thrust piece
22 Screw
23 Screw ring
24 Radial axis
25 Gap
26 Outer bearing shell of a ball bearing
27 Inner bearing shell of a ball bearing
28 Guide groove
29 Ball of a ball bearing
30 Shell parts of a bearing shell
31 Ball cage
32 Web

The invention claimed is:

1. A fixed bearing for a steering gear, comprising:
a bearing sleeve;
a ball bearing, including:
at least one row of bearing balls;
an inner bearing shell configured to receive a pinion shaft of the steering gear; and
an outer bearing shell received in the bearing sleeve, each of the inner bearing shell and the outer bearing shell having at least one respective guide groove configured to receive and guide the at least one row of bearing balls; and
a pivot ring that includes:
an outer ring configured to mount the fixed bearing in a housing of the steering gear;
an inner ring connected to the bearing sleeve; and
at least one torsion web that connects the outer ring to the inner ring, and
wherein at least one of the inner bearing shell and the outer bearing shell is formed from at least two shell parts, each of the shell parts defining at least a portion of the respective guide groove, and
wherein the inner bearing shell and the outer bearing shell have shoulders that form the respective guide groove, the shoulders having a height in a radial direction configured such that the bearing balls are not insertable or removable with the at least two shell parts installed.

2. The fixed bearing as claimed in claim 1, wherein the inner bearing shell is formed from the at least two shell parts, and the outer bearing shell is formed as a single piece.

3. The fixed bearing as claimed in claim 1, wherein the ball bearing is a single-row ball bearing.

4. The fixed bearing as claimed in claim 1, wherein the shell parts are supported directly against one another.

5. The fixed bearing as claimed in claim 1, wherein the ball bearing is a multi-row ball bearing.

6. The fixed bearing as claimed in claim 1, wherein the shell parts delimit a gap.

7. The fixed bearing as claimed in claim 1, further comprising:
a separate fastening element that holds the shell parts together.

8. The fixed bearing as claimed in claim 1, wherein the at least one row of ball bearings includes exactly two rows of ball bearings, the plurality of respective guide grooves includes exactly two guide grooves, and the at least two shell parts includes exactly two shell parts, each of which defines one of the two guide grooves.

9. The fixed bearing as claimed in claim 8, wherein the outer bearing shell includes a web extending radially inwardly between the two guide grooves, the web partially defining the two guide grooves.

10. The fixed bearing as claimed in claim 1, wherein the inner ring is arranged inside the bearing sleeve.

11. The fixed bearing as claimed in claim 10, wherein the inner ring is supported directly on the outer bearing shell.

12. The fixed bearing as claimed in claim 10, wherein the inner ring is supported on the outer bearing shell via an intermediate disk that is interposed between the inner ring and the outer bearing shell.

13. The fixed bearing as claimed in claim 10, further comprising:
a support disk arranged on an opposite side of the inner ring from the outer bearing shell, the support disk interposed between the inner ring and an end lip of the bearing shell.

14. A steering gear for a steering system of a motor vehicle, comprising:
a housing;
a toothed wheel:
a fixed bearing mounted directly or indirectly in the housing, the fixed bearing including:
a bearing sleeve;
a ball bearing, including:
at least one row of bearing balls;
an inner bearing shell; and
an outer bearing shell received in the bearing sleeve, each of the inner bearing shell and the outer bearing shell having at least one respective guide groove configured to receive and guide the at least one row of bearing balls; and
a pivot ring that includes:
an outer ring configured to mount the fixed bearing in the housing;
an inner ring connected to the bearing sleeve; and
at least one torsion web that connects the outer ring to the inner ring,
wherein at least one of the inner bearing and the outer bearing shell is formed from at least two shell parts, each of the shell parts defining at least a portion of the respective guide groove, and
wherein the inner bearing shell and the outer bearing shell have shoulders that form the respective guide groove, the shoulders having a height in a radial direction configured such that the bearing balls are not insertable or removable with the at least two shell parts installed; and a helical pinion shaft, including:
  a helical pinion that meshes with the toothed wheel; and
  a shaft portion located on one side of the helical pinion, and received in the inner bearing shell of the fixed bearing.

15. A steering system comprising:
a steering gear including:
  a housing;
  a toothed wheel:
  a fixed bearing mounted directly or indirectly in the housing, the fixed bearing having:
    a bearing sleeve;
    a ball bearing, that includes:
      at least one row of bearing balls;
      an inner bearing shell; and
      an outer bearing shell received in the bearing sleeve, each of the inner bearing shell and the outer bearing shell having at least one respective guide groove configured to receive and guide the at least one row of bearing balls; and
    a pivot ring that includes:
      an outer ring configured to mount the fixed bearing in the housing;
      an inner ring connected to the bearing sleeve; and
      at least one torsion web that connects the outer ring to the inner ring,
    wherein at least one of the inner bearing and the outer bearing shell is formed from at least two shell parts, each of the shell parts defining at least a portion of the respective guide groove, and
    wherein the inner bearing shell and the outer bearing shell have shoulders that form the respective guide groove, the shoulders having a height in a radial direction configured such that the bearing balls are not insertable or removable with the at least two shell parts installed; and
  a helical pinion shaft, including:
    a helical pinion that meshes with the toothed wheel; and
    a shaft portion located on one side of the helical pinion, and received in the inner bearing shell of the fixed bearing; and
a steering motor connected with rotational driving action to the helical pinion shaft of the steering gear.

* * * * *